United States Patent
Nakagawa

(10) Patent No.: US 11,042,239 B2
(45) Date of Patent: Jun. 22, 2021

(54) INFORMATION PROCESSING DEVICE AND OPERATION MANAGEMENT METHOD FOR A CURVED TOUCH PANEL

(71) Applicant: CANON KABUSHIKI KAISHA, Tokyo (JP)

(72) Inventor: Kenichiro Nakagawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 256 days.

(21) Appl. No.: 15/337,475

(22) Filed: Oct. 28, 2016

(65) Prior Publication Data

US 2017/0123577 A1    May 4, 2017

(30) Foreign Application Priority Data

Oct. 29, 2015    (JP) .............................. JP2015-213186

(51) Int. Cl.
*G06F 3/0488*    (2013.01)
*G06F 3/041*    (2006.01)

(52) U.S. Cl.
CPC .......... *G06F 3/0416* (2013.01); *G06F 3/0488* (2013.01); *G06F 2203/04102* (2013.01); *G06F 2203/04105* (2013.01)

(58) Field of Classification Search
None
See application file for complete search history.

(56) References Cited

U.S. PATENT DOCUMENTS

| | | | |
|---|---|---|---|
| 7,761,814 B2* | 7/2010 | Rimas-Ribikauskas | G06F 3/017 715/863 |
| 9,310,889 B2* | 4/2016 | Griffin | G06F 3/017 |
| 2010/0182265 A1* | 7/2010 | Kim | G06F 1/1616 345/173 |

(Continued)

FOREIGN PATENT DOCUMENTS

| | | |
|---|---|---|
| CN | 1758205 A | 4/2006 |
| CN | 102033648 A | 4/2011 |
| CN | 104081326 A | 10/2014 |

(Continued)

OTHER PUBLICATIONS

Korean Office Action for application No. 10-2016-0135435 dated Jul. 1, 2019 with English translation.

(Continued)

*Primary Examiner* — Ram A Mistry
(74) *Attorney, Agent, or Firm* — Carter, DeLuca & Farrell LLP

(57) ABSTRACT

Provided is an information processing device, which is configured to inhibit an unintended operation of a user from being erroneously detected when a flick operation is performed on a curved touch panel. An operation content including a direction of a flick performed with a finger on a curved front surface of a touch panel is detected, and a curvature ratio of the front surface corresponding to the detected direction is acquired. Further, a flick threshold value using a curvature ratio as a parameter is determined, and characteristics of the detected operation content are quantified as a flick score. Then, through comparison between the flick threshold value and the flick score, it is judged whether or not a touch operation is the flick operation.

21 Claims, 11 Drawing Sheets

(56) References Cited

U.S. PATENT DOCUMENTS

2015/0070382 A1\* 3/2015 Anderson ............. G06F 3/0487
                                                                  345/619
2015/0212725 A1   7/2015 Yamano

FOREIGN PATENT DOCUMENTS

| CN | 104798018 A | 7/2015 |
| JP | 2012-133428 A | 7/2012 |
| JP | 2014-115705 A | 6/2014 |
| JP | 2015141526 A | 8/2015 |
| JP | 2015170282 A | 9/2015 |
| KR | 10-2013-0068071 A | 6/2013 |

OTHER PUBLICATIONS

Chinese Office Action for application No. 201610958501.X dated Aug. 23, 2019 with English translation.

\* cited by examiner

| DIRECTION OF TOUCH OPERATION | CURVATURE RATIO OF TOUCH PANEL (CURVATURE) |
|---|---|
| 0~45 DEGREES | 1/200 mm |
| 45~90 DEGREES | 1/100 mm |
| 90~135 DEGREES | 1/100 mm |
| 135~180 DEGREES | 1/200 mm |
| 180~225 DEGREES | 1/200 mm |
| 225~270 DEGREES | 1/100 mm |
| 270~315 DEGREES | 1/100 mm |
| 315~360 DEGREES | 1/200 mm |

| POSITION OF TOUCH OPERATION | DIRECTION OF TOUCH OPERATION | CURVATURE RATIO OF TOUCH PANEL (CURVATURE) |
|---|---|---|
| 0≦X<20 AND 0≦Y<20 | 30~150 DEGREES | 1/150 mm |
| | 150~210 DEGREES | 1/200 mm |
| | 210~330 DEGREES | 1/160 mm |
| | 330~30 DEGREES | 1/200 mm |
| 20≦X<40 AND 0≦Y<20 | 30~150 DEGREES | 1/160 mm |
| | 150~210 DEGREES | 1/200 mm |
| | 210~330 DEGREES | 1/170 mm |
| | 330~30 DEGREES | 1/200 mm |
| ⋮ | ⋮ | ⋮ |

INFORMATION PROCESSING DEVICE AND OPERATION MANAGEMENT METHOD FOR A CURVED TOUCH PANEL

BACKGROUND OF THE INVENTION

Field of the Invention

The present invention relates to an information processing device configured to manage a touch operation performed for a curved touch panel.

Description of the Related Art

In recent years, not only products including a flat touch panel but also products including a curved touch panel have emerged. Further, devices having a curvature ratio determined at the time of operation instead of the time of design, e.g., a paper-like display, are expected to emerge. As examples of such curved devices, there exist a touch panel disclosed in Japanese Patent Application Laid-open No. 2014-115705 and a display device disclosed in Japanese Patent Application Laid-open No. 2012-133428. The touch panel disclosed in Japanese Patent Application Laid-open No. 2014-115705 includes: a detection member having a flat shape configured to detect a contact position when a fingertip touches a front surface of the touch panel; and a curved member configured to support a back surface of the detection member and to cause the detection member to curve. In this touch panel, a bend of the detection member exhibited when the front surface of the detection member is pressed by the fingertip is suppressed by the curved member, and hence operability and durability are expected to improve.

Further, the display device disclosed in Japanese Patent Application Laid-open No. 2012-133428 is configured by bonding a touch panel to a liquid crystal panel formed to have a curved shape and arranging a surface protective plate on a front surface of the touch panel. In this display device, it is expected that a sensitivity of touch detection can be inhibited from being lowered by adjusting a bonding layer to have an appropriate film thickness.

In the curved touch panels disclosed in Japanese Patent Application Laid-open No. 2014-115705 and Japanese Patent Application Laid-open No. 2012-133428, an operation content is sometimes erroneously detected at the time of a touch operation. For example, even when a user believes that he or she has performed a swipe (operation for sliding a finger on a touch panel), the touch panel sometimes judges the swipe as a flick (operation for flipping the touch panel with a finger). Therefore, a command that is not intended by the user is sometimes activated, which causes confusion.

The present invention has an object to provide an information processing device configured to reduce erroneous detection of an operation content of a touch operation performed on a touch panel having a curved front surface.

SUMMARY OF THE INVENTION

An information processing device according to the present disclosure includes a detection unit configured to detect an operation content including a direction and a speed of a touch operation input to a touch panel having a curved front surface; an acquisition unit configured to acquire a degree of a curve of the touch panel along the detected direction; a determination unit configured to determine a condition relating to the speed of the touch operation, which differs depending on the acquired degree of the curve; and a judgment unit configured to judge that the touch operation is a flick operation based on a fact that the detected speed satisfies the condition relating to the speed of the touch operation determined by the determination unit.

Further features of the present invention will become apparent from the following description of exemplary embodiments (with reference to the attached drawings).

DESCRIPTION OF THE EMBODIMENTS

Figure 1:
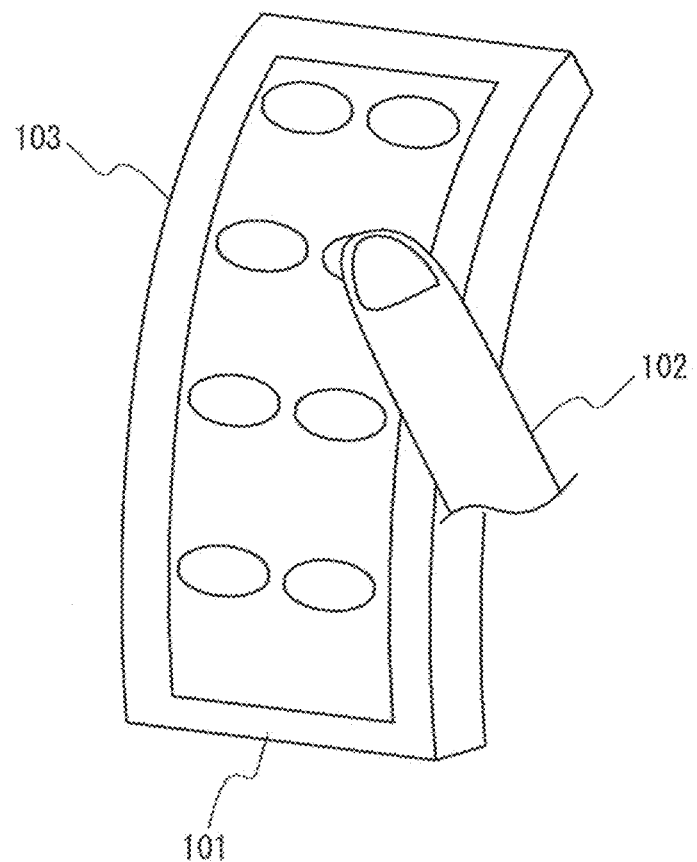
FIG. 1 is an illustration of an example of a curved touch panel.
Figure 2:
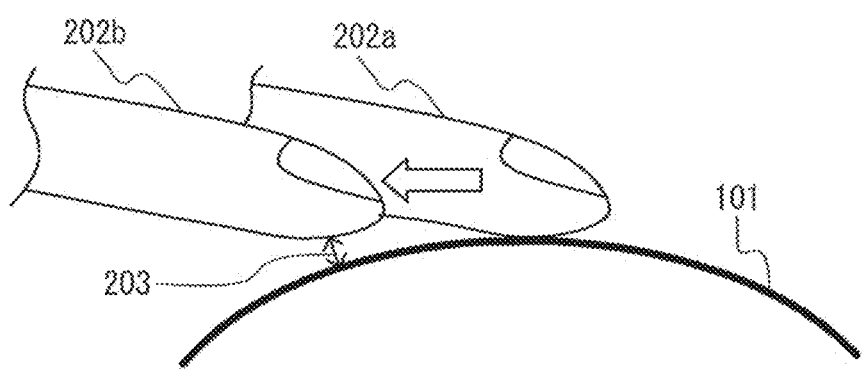
FIG. 2 is an explanatory diagram for illustrating a reason that a flick operation is erroneously detected.

Before embodiments of the present invention are described, a reason that erroneous detection of a touch operation occurs on a touch panel having a curved front surface is clarified. For example, it is assumed that, as illustrated in FIG. 1, a user touches a graphical user interface (GUI) image 103 displayed on a touch panel 101 with his or her finger 102, which is an example of an instruction input body, and linearly moves the finger 102 while maintaining a contact state. The finger 102 is lifted from the GUI image 103 at a moving destination. A touch operation having such an operation content is a "swipe" described above. Meanwhile, a "flick" has such an operation content that the GUI image 103 is touched and then flipped swiftly with the finger 102. It is possible to distinguish between the swipe and the flick based on a moving speed of the finger 102 exhibited when the finger 102 is lifted from the front surface of the touch panel. For example, the operation content is judged as the flick in a case where the moving speed of the finger 102 exhibited when the finger 102 is lifted exceeds a threshold value, and otherwise judged as the swipe. However, when a finger 202a is linearly moved on the curved front surface of the touch panel 101 as illustrated in FIG. 2, a gap 203 occurs between a finger 202b being moved and the touch panel 101. Therefore, when the gap 203 occurs even though the user moves the finger 202a with a constant speed in the belief that he or she keeps performing the swipe, the operation content is erroneously judged as the flick. The following description is directed to an information processing device according to the exemplary embodiments configured to prevent such erroneous judgment.

Figure 3:
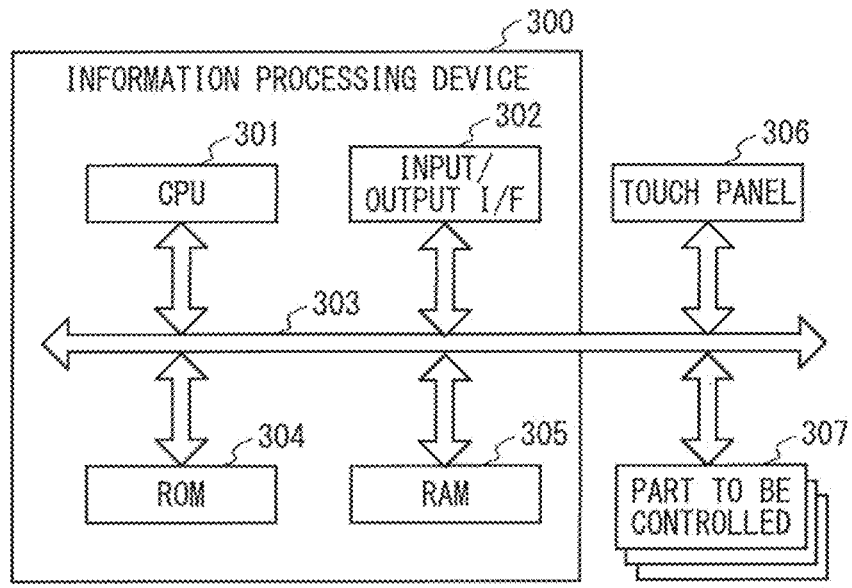
FIG. 3 is a hardware configuration diagram of an information processing device according to a first embodiment of the present invention.

FIG. 3 is a hardware block diagram of an information processing device according to a first embodiment of the present invention. An information processing device 300 according to the first embodiment includes a computer including a central processing unit (CPU) 301, an input/output I/F 302 for an external storage device, a read only memory (ROM) 304, and a random access memory (RAM) 305, which are connected to a bus 303. A touch panel 306 and parts 307 to be controlled are also connected to the bus 303. The touch panel 306 is an input/output device configured to receive the user's touch operation, and has a curved front surface. The parts 307 to be controlled are physical and logical parts to be controlled by contents input through touch operations.

The CPU 301 is configured to control each device connected through the bus 303. The CPU 301 is further configured to execute a computer program according to one embodiment of the present invention, to thereby implement different kinds of functions described later on the information processing device 300. The input/output I/F 302 is an interface configured to input and output data from/to the external storage device, e.g., a hard disk drive. The ROM 304 stores an operating system (OS), the above-mentioned computer program, a device driver, and the like. The RAM 305 is used as a temporary storage area, e.g., a main memory or a work area, for the CPU 301.

Figure 4:
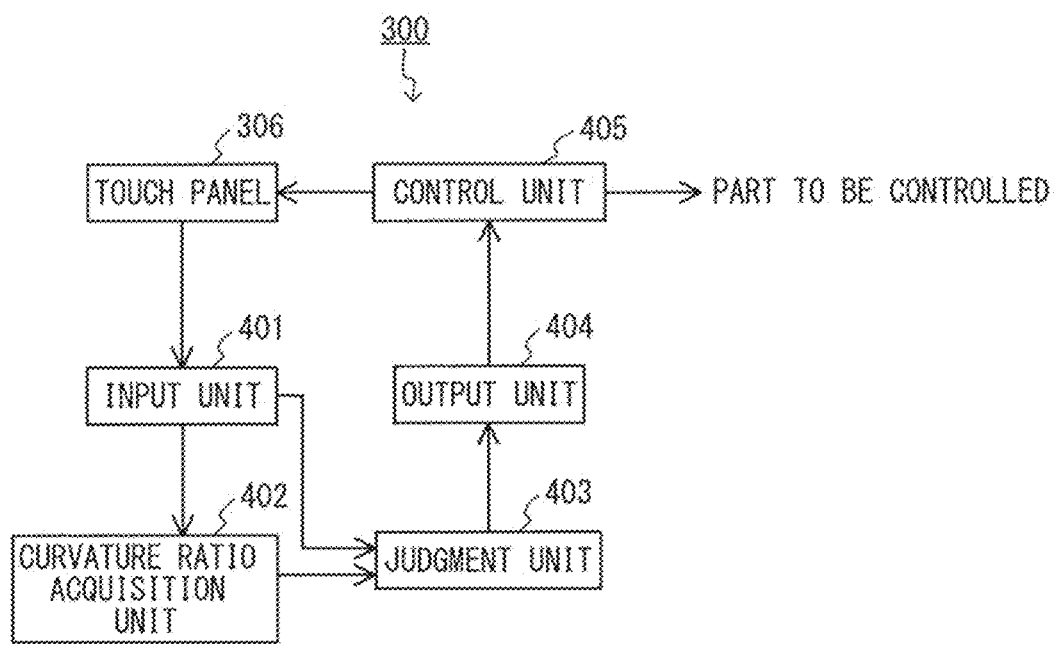
FIG. 4 is a functional configuration diagram of the information processing device according to the first embodiment.

FIG. 4 is an illustration of a configuration example of functional blocks implemented on the information processing device 300 by the CPU 301 executing the computer program according to one embodiment of the present invention. Referring to FIG. 4, the information processing device 300 includes an input unit 401, a curvature ratio acquisition unit 402, a judgment unit 403, an output unit 404, and a control unit 405.

The input unit 401 is configured to detect the operation content including a direction of the touch operation performed on the touch panel 306. In short, the input unit 401 functions as a detection unit for the operation content. Examples of the operation content to be detected include an operation of touching the touch panel 306 with the user's finger (touch), an operation of lifting the finger from the touch panel 306 (lift), and an operation of moving the finger while maintaining the contact state (touch move). The "flick" and "swipe" described above are also included in the examples of the operation content to be detected. The input unit 401 stores the detected operation content in a predetermined memory, for example, the work area of the RAM 305. The detected operation content is thus stored in order to detect the operation content identified based on a touch operation sequence (association between a given operation and the previous operation). At least the touch operation detected immediately before a given operation is stored in the work area. One of features of the information processing device 300 according to this embodiment lies in that the "direction" of the touch operation is included as the operation content. This feature is described later.

The curvature ratio acquisition unit 402 functions as an acquisition unit configured to acquire a degree of the curve of the touch panel 306 exhibited when the touch operation occurs. In this embodiment, the curvature ratio acquisition unit 402 acquires a curvature ratio as an index representing the degree of the curve. The curvature ratio is an amount representing how greatly a curved surface is bent. A known curvature or a radius of curvature can be used as an example of the curvature ratio. The curvature ratio can also be originally defined based on measurement values of respective actual parts. Specific details of the curvature ratio and a mode of acquiring the curvature ratio are described later.

The judgment unit 403 functions as a judgment unit configured to judge whether or not the touch operation is a predetermined operation based on the curvature ratio. That is, the judgment unit 403 determines a threshold value for distinguishing between the predetermined operation and another operation based on a function using the acquired curvature ratio as a parameter. Then, the judgment unit 403 determines an operation score obtained by quantifying characteristics of the detected operation content based on a predetermined rule, and compares the operation score with the threshold value, to thereby judge whether or not the touch operation is the predetermined operation. The operation score is a numerical value representing the likelihood of the predetermined operation. Specific examples of the predetermined rule and the operation score are described later.

The output unit 404 is configured to notify the control unit 405 of the operation content of the touch operation judged by the judgment unit 403 as an event. The control unit 405 is configured to control an operation of the parts 307 to be controlled, a screen transition of the touch panel 306, or the like based on the event.

Figures 7A, 7B:
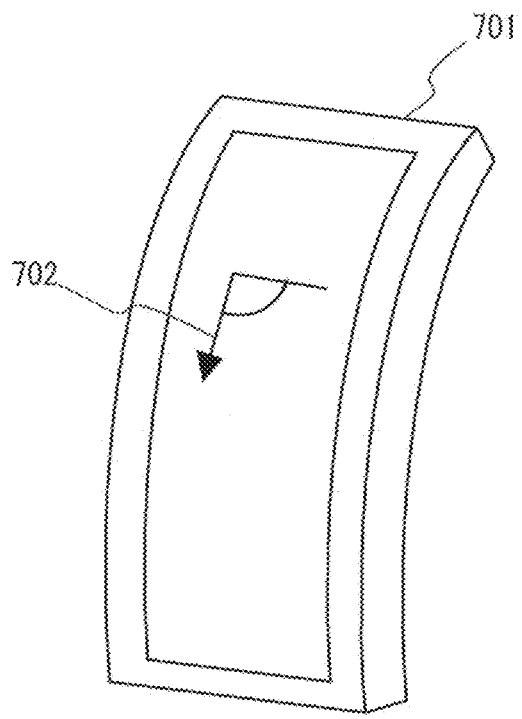
FIG. 7A is an illustration of an example of the touch panel.
FIG. 7B is an illustration of an example of a curvature ratio table.

Next, a description is made of an example of an operation management method for the touch panel, which is executed by the information processing device 300. In this embodiment, it is assumed that the touch panel has a shape and the structure illustrated in FIG. 7A. It is further assumed that the predetermined operation is a flick operation and another operation content is a swipe operation. A touch panel 701 illustrated in FIG. 7A is curved toward one direction with a fixed curvature ratio, and a reference position and a reference direction are defined. The reference position and the reference direction are set to, for example, a top side of the touch panel 701. An angle formed with respect to a plane containing the top side is detected as a direction 702. For example, it is assumed that the touch move is detected immediately before the lift being the last operation of the flick occurs and that the lift is then detected. In this case, the direction 702 of the touch operation can be detected through comparison between a relative position (relative coordinates with respect to the touch panel 701) at which the touch move has occurred and a position (ditto) at which the lift has occurred.

In this embodiment, a curvature ratio table is created by associating the curvature ratio with the direction of the touch operation based on actual measurements, and is stored in the RAM 305 in advance. FIG. 7B is an illustration of an example of a curvature ratio table 703 in which the curvature ratio is expressed through use of the curvature. In the curvature ratio table 703, the direction of the touch operation is defined based on angular ranges in advance. For example, when the direction of the touch operation with respect to the top side of the touch panel 701 is 0 degrees to 45 degrees, 1/200 mm is identified as the curvature ratio. With reference to the curvature ratio table 703 described above, the curvature ratio can be swiftly acquired with the direction 702 of the touch operation being used as a key.

Figure 5:
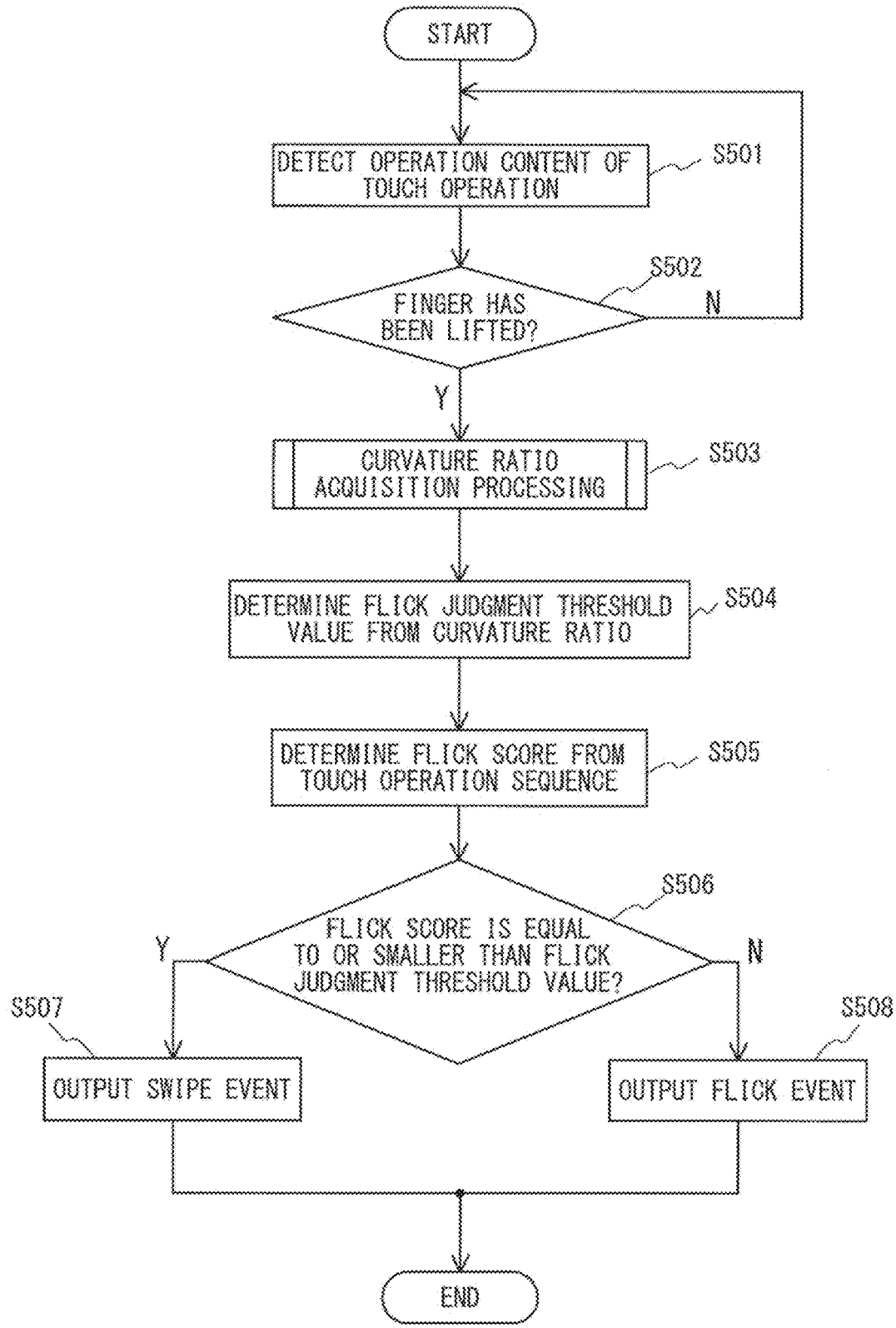
FIG. 5 is an explanatory diagram of an overall procedure of an operation management method for the touch panel.

FIG. 5 is an explanatory diagram of an overall procedure of the operation management method. The operation management method is started when the user performs the touch operation on a front surface of the touch panel 701. Referring to FIG. 5, the input unit 401 detects the operation content of the touch operation (Step S501). When the touch operation is performed, a touch event is inserted into an event queue of the CPU 301. The input unit 401 detects the touch operation with a trigger that the touch event is inserted, and receives the touch event. The input unit 401 judges whether or not the event is a lift operation, that is, whether or not the event is an event representing the operation of lifting the finger (Step S502). When the event is not the operation of lifting the finger (N in Step S502), the operation is not at least the flick, and hence the procedure returns to Step S501. When the event is the lift operation (Y in Step S502), the input unit 401 detects a direction exhibited when the lift operation is detected, and shifts the processing to the curvature ratio acquisition unit 402 along with a detection result.

Figure 6:
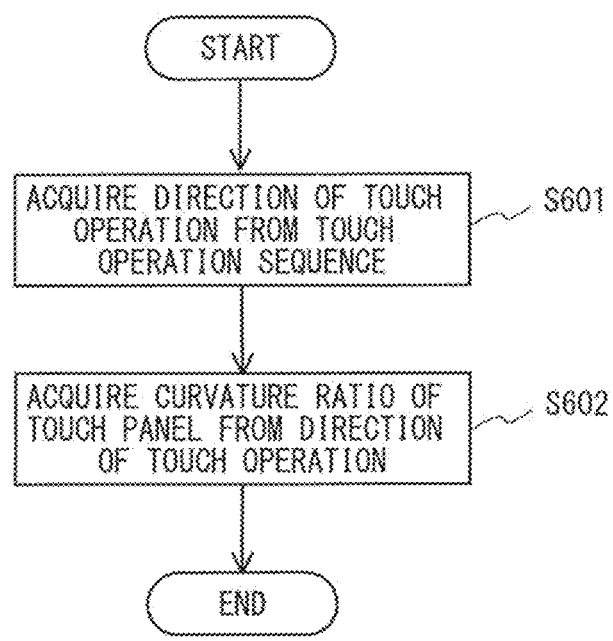
FIG. 6 is an explanatory diagram of a procedure of curvature ratio acquisition processing according to the first embodiment.

The curvature ratio acquisition unit 402 executes curvature ratio acquisition processing to acquire the curvature ratio of the front surface of the touch panel 701 (Step S503). FIG. 6 is an illustration of an example of a processing procedure conducted when the curvature ratio is acquired with reference to a table. Referring to FIG. 6, the curvature ratio acquisition unit 402 acquires the direction of the touch operation from the above-mentioned touch operation sequence (Step S601). Then, the curvature ratio acquisition unit 402 refers to the curvature ratio table 703 with the acquired direction of the touch operation being used as a key to acquire the curvature ratio corresponding to the direction (Step S602). For example, it is assumed that the direction of the touch operation is 100 degrees with respect to the reference direction based on a detection position of the lift and a start position of the previous touch move. In this case, the curvature ratio acquisition unit 402 acquires the curvature ratio (curvature) as ¹⁄₁₀₀ mm from the curvature ratio table 703. After acquiring the curvature ratio, the curvature ratio acquisition unit 402 shifts the processing to the judgment unit 403.

Returning to FIG. 5, the judgment unit 403 determines the threshold value based on the acquired curvature ratio (Step S504). In this embodiment, the threshold value is a flick threshold value for judging the touch operation performed by the user as the flick. The judgment unit 403 determines the flick threshold value based on the following continuous function being an example of the predetermined rule. A constant indicative of a sensitivity is represented by A, and a constant for error absorption is represented by B. The constants A and B are both stored in the ROM 304.

$$\text{(flick threshold value)} = A \times T + B \quad (1)$$

(where T represents the curvature ratio of the touch panel exhibited when the operation of lifting the finger occurs)

The flick threshold value increases as the curvature ratio increases toward a convex shape. The constant B is added in order to prevent a slightly touching operation from being judged as the flick. The flick threshold value is determined through use of such a continuous function as expressed by Expression (1), to thereby further facilitate determination processing, which serves to alleviate a processing load. The judgment unit 403 stores the determined flick threshold value in the RAM 305, and dynamically changes the flick threshold value each time the subsequent touch operation occurs.

The judgment unit 403 further determines a flick score being an example of the operation score from the touch operation sequence (Step S505). The flick score is determined based on the following continuous function being an example of the predetermined rule. A constant indicative of a sensitivity is represented by C, and is stored in the ROM 304.

$$\text{(flick score)} = \text{(speed exhibited when the finger is lifted)} \times C \quad (2)$$

The flick score may be determined in consideration of a moving distance (distance from the previous touch to the lift) of the finger as follows. That is, a fact that the user has moved the finger with a clear intention may be included in the parameters. A constant indicative of a sensitivity for the above-mentioned purpose is represented by D, and is stored in the ROM 304.

$$\text{(flick score)} = \text{(speed exhibited when the finger is lifted)} \times C + \text{(moving distance of the finger)} \times D \quad (3)$$

The flick score is determined through use of such continuous functions as expressed by Expressions (2) and (3), to thereby be able to alleviate the load on the determination processing.

The determined flick score is stored in the RAM 305, and is dynamically changed (updated) each time the subsequent touch operation occurs. Values estimated by an inference engine (not shown) or the like can be used as the constants A to D based on shapes and structure of a large number of touch panels of the same kind, track records of a large number of users' operations, and the like.

After determining the flick threshold value and the flick score, the judgment unit 403 conducts a comparison between both (Step S506). When the flick score is equal to or smaller than the flick threshold value (Y in Step S506), the judgment unit 403 judges the touch operation as the swipe, and notifies the output unit 404 of a swipe event (Step S507). Meanwhile, when the flick score exceeds the flick threshold value (N in Step S506), the judgment unit 403 judges the touch operation as the flick, and notifies the output unit 404 of a flick event (Step S508). The swipe event or the flick event is output from the output unit 404 to the control unit 405.

In this manner, with the information processing device 300 according to this embodiment and the operation management method using the same, when the user lifts his or her finger from the touch panel 701, the flick threshold value is dynamically changed depending on the curvature ratio corresponding to the direction exhibited at the time of the lift. In short, the flick threshold value is not uniform over the entire touch panel, and an appropriate flick threshold value is used to judge the operation content based on the position and the direction in which the operation is performed.

Figure 8:
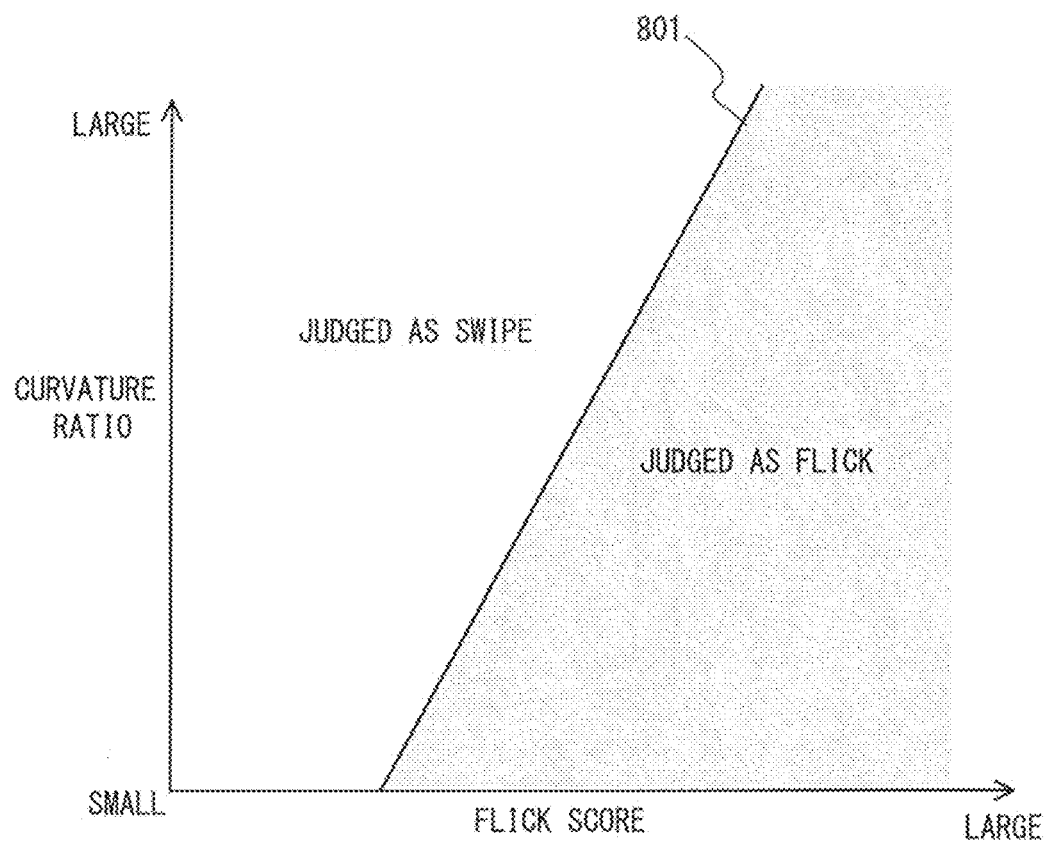
FIG. 8 is a graph for showing an example of a judgment result of a flick based on degrees of a curvature ratio and a flick score.

FIG. 8 is a graph for showing an example of a judgment result of the swipe or the flick based on degrees of the curvature ratio and the flick score. As expressed by Expressions (2) and (3), the flick score is determined based on the continuous function. Therefore, for example, when the constant A of Expression (1) described above is positive, a flick threshold value 801 increases as the curvature ratio increases. This relationship means that it becomes more difficult for the flick event to be detected as the finger becomes more liable to be lifted from the touch panel with the increase in the curvature ratio. In short, the above-mentioned relationship means that the flick event is inhibited from being erroneously detected. Meanwhile, in an area with a small curvature ratio, the moving speed at the time of the lift can be used as the flick threshold value, and hence operability is inhibited from being lowered.

Expressions (1), (2), and (3) are examples of a calculation expression using a continuous function, and another calculation expression may be used. Further, for example, a correspondence relationship between the curvature ratio and the flick threshold value, which is obtained by Expression (1), may be held in a holding unit, e.g., a memory, as a table in advance instead of repeating the processing based on the continuous function for each frame. In that case, in Step S504, the flick threshold value corresponding to the curvature ratio acquired in Step S503 is acquired with reference to the table.

The example in which the curvature ratio is acquired with reference to the table using the curvature ratio table 703 created in advance is described above, but the curvature ratio may be dynamically calculated through use of a history of a detection position of the touch operation or the like to acquire a calculation result. In another case, a communication unit may be additionally provided to access an external service, and the curvature ratio may be acquired from the external service. Further, this embodiment is described by taking the swipe operation as an example, but this embodiment can be similarly applied to an operation of a drag used generally when a target object is clearer than in the case of the swipe.

Figure 9:
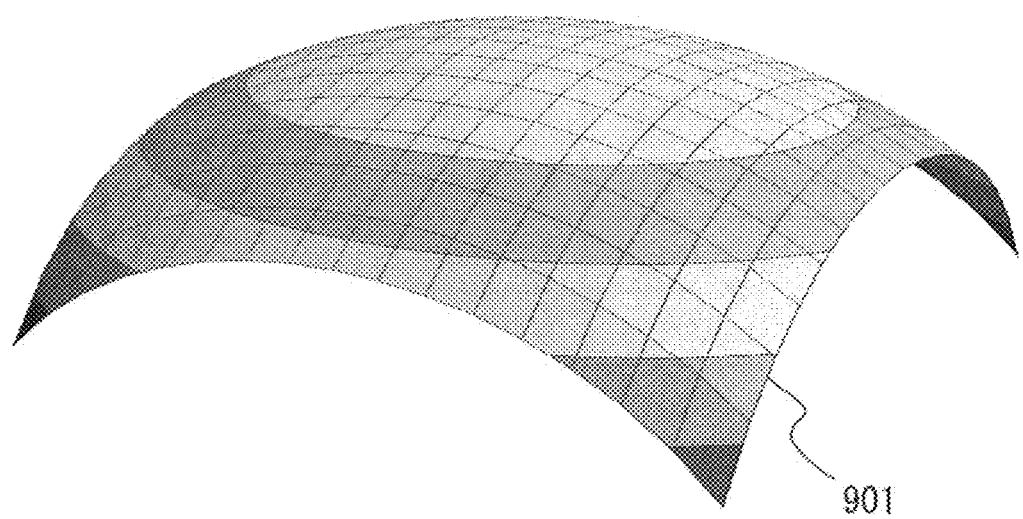
FIG. 9 is an illustration of an example of a touch panel to be used in a second embodiment of the present invention.

Now, a second embodiment of the present invention is disclosed. The first embodiment is described by taking the example in which the touch panel is curved toward one direction with a fixed curvature ratio. A description of a second embodiment of the present invention is directed to a case of operating a touch panel 901 that is curved so complicatedly that the curvature ratio changes depending on the position and the direction as illustrated in FIG. 9. The hardware configuration of the information processing device 300 and the configuration of the functional blocks thereof are the same as those of the first embodiment.

When the information processing device 300 employs the touch panel 901 that is thus curved complicatedly, details of the curvature ratio acquisition processing (Step S503) within the processing illustrated in FIG. 5 are different from those of the first embodiment.

Figure 10:
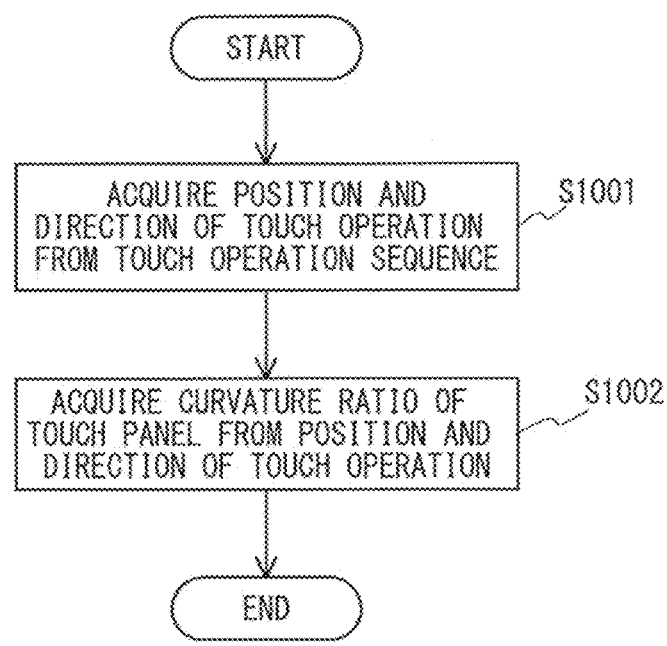
FIG. 10 is an explanatory diagram of a procedure of curvature ratio acquisition processing according to the second embodiment.

FIG. 10 is an illustration of an example of a procedure for the curvature ratio acquisition processing according to the second embodiment. Referring to FIG. 10, the judgment unit 403 acquires the position and the direction of the touch operation from the touch operation sequence (Step S1001). That is, a position at which the lift operation has occurred is set as a position of the touch operation. Further, the judgment unit 403 determines the direction of the touch operation based on a position of the touch move exhibited immediately before the lift operation is detected and the position of the touch operation. Then, the judgment unit 403 uses the determined data to acquire the curvature ratio of the touch panel exhibited when the operation is detected (Step S1002).

Figures 11A, 11B:
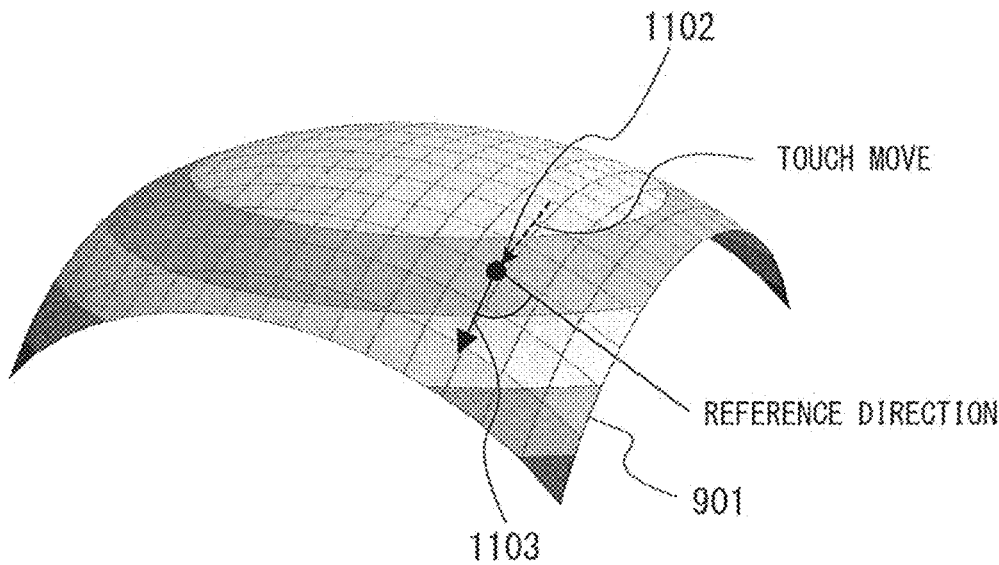
FIG. 11A is an explanatory diagram of an operation example according to the second embodiment.
FIG. 11B is an illustration of an example of a curvature ratio table.

FIG. 11A indicates that the lift is detected at a position 1102 of the touch operation after a touch move operation is performed along a front surface of the touch panel 901 having the shape illustrated in FIG. 9. The reference direction is a direction defined arbitrarily in an X-Y coordinate system of the touch panel 901. A direction 1103 of the touch operation is an extension of the direction of the touch move.

FIG. 11B is an illustration of an example of a curvature ratio table 1104 according to the second embodiment. In the curvature ratio table 1104, the position of the touch operation, the direction of the touch operation, and the curvature ratio (curvature) of the touch panel 901 are recorded in association with one another. The position and the direction of the touch operation are indicated by ranges.

The judgment unit 403 refers to the curvature ratio table 1104 to acquire the curvature ratio of the touch panel 901 corresponding to the position and the direction of the touch operation. Specifically, it is assumed that a position (X-coordinate, Y-coordinate) at which the touch operation has occurred is (10, 10) and the direction of the touch operation is 300 degrees with respect to the reference direction. In this case, the curvature ratio of 1/160 mm can be acquired from the curvature ratio table 1104. In the same manner as in the first embodiment, the judgment unit 403 uses the acquired curvature ratio to determine the flick threshold value, and compares the flick threshold value with the flick score, to thereby output the judgment result of the flick or the swipe. In this manner, according to the second embodiment, even with the complicatedly curved touch panel 901, the erroneous judgment of the flick or the swipe can be inhibited.

Figure 12:
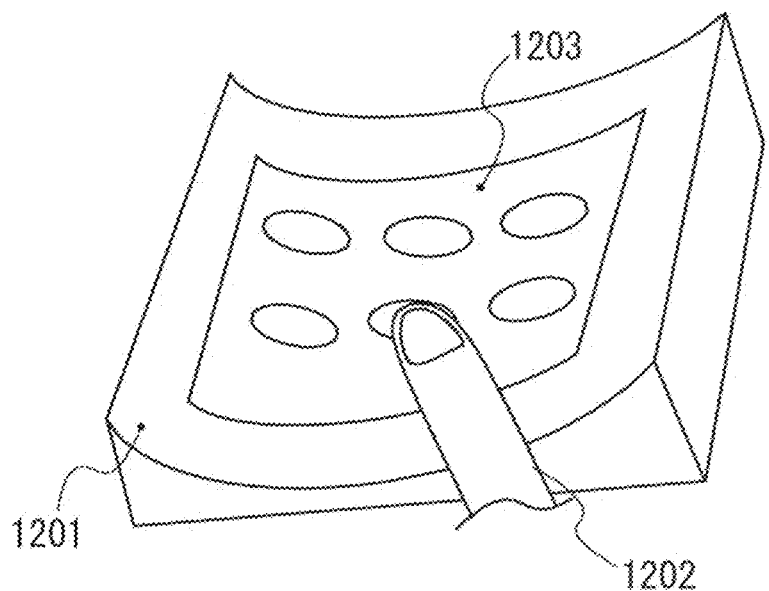
FIG. 12 is an illustration of an example of a touch panel to be used in a third embodiment of the present invention.

Now, a third embodiment of the present invention is disclosed. In both the first embodiment and the second embodiment, the example in which the touch panel is curved to have a convex shape is described. In a third embodiment of the present invention, an example in which a touch panel to be operated is concavely curved. The hardware configuration of the information processing device 300 and the configuration of the functional blocks thereof are the same as those of the first embodiment. FIG. 12 is an illustration of an example of a concavely curved touch panel 1201. The description of the third embodiment is directed to a case where the user performs a flick operation for a GUI image 1203 displayed on the concavely curved touch panel 1201 with a finger 1202.

Figure 13:
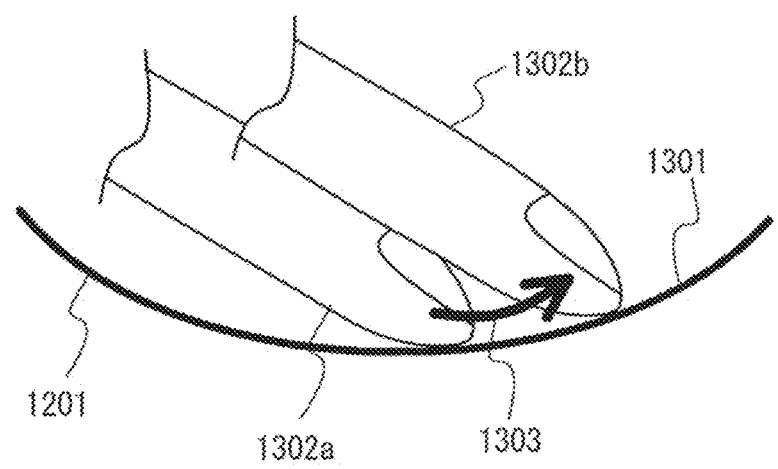
FIG. 13 is an explanatory diagram for illustrating a reason that an operation is erroneously detected on a concavely curved touch panel.

Such a phenomenon as illustrated in FIG. 13 occurs on a front surface the touch panel 1201 illustrated in FIG. 12. That is, it is assumed that a finger 1302a of the user brought into contact with a front surface 1301 of the concavely curved touch panel 1201 is used to perform a flick toward a finger 1302b. The front surface 1301 is concavely curved, and hence no gap occurs between the finger 1302b and the touch panel when a speed of the flick decreases. The moving speed of the finger exhibited when the finger is lifted is often used to judge whether or not the operation is the flick operation or another operation. Therefore, in a case where the moving speed of the finger is small when the finger is lifted, the flick believed to have been performed by the user is erroneously detected as the swipe operation. In order to solve such a problem, in the third embodiment, a magnitude of a curve is defined. In the processing for determining the flick threshold value (Step S504) of FIG. 5, the magnitude of the curve is included in the parameters. The magnitude of the curve is an absolute value obtained assuming that the curve of the convex shape is positive and the curve of the concave shape is negative. The curvature ratio table is created based on the magnitude of the curve.

Figure 14:
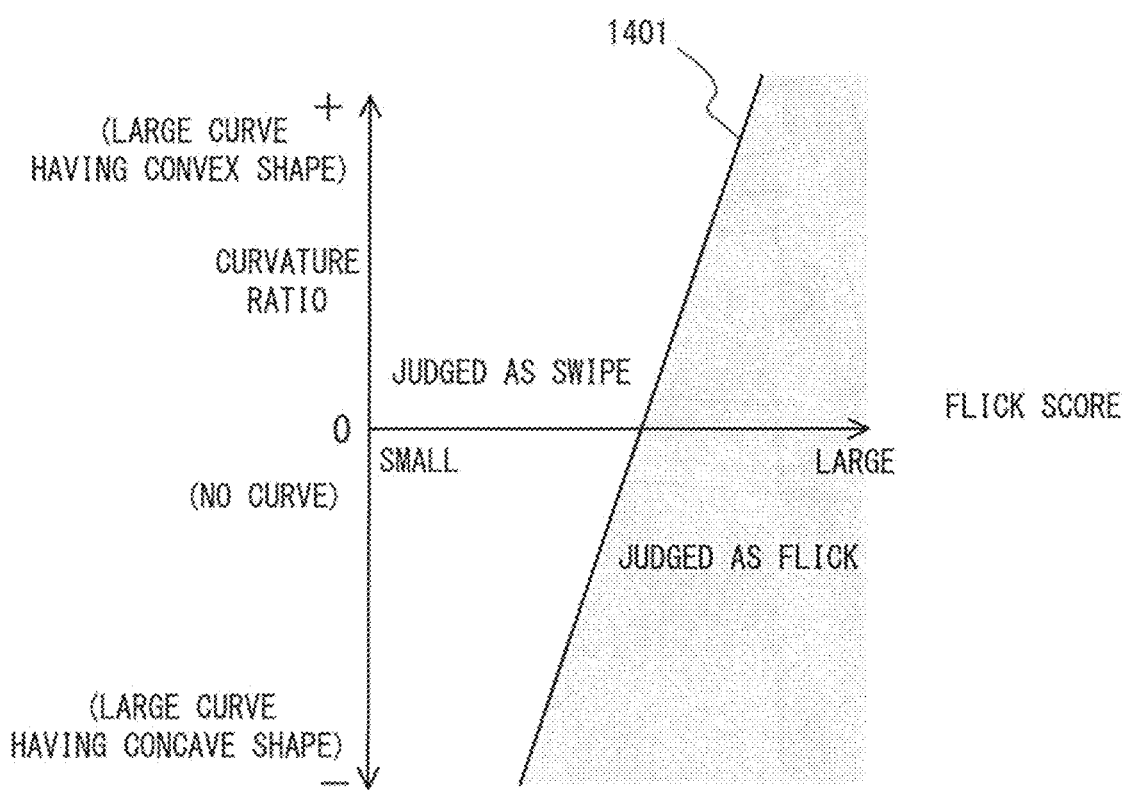
FIG. 14 is a graph for showing a relationship between the curvature ratio of a convex shape or a concave shape and an operation judgment result.

FIG. 14 is a graph for showing a relationship between the curvature ratio of the convex shape or the concave shape and the judgment of the swipe or the flick. When the constant A of Expression (1) is positive to exhibit a convex shape, the flick threshold value is changed more greatly as the curvature ratio increases toward the convex shape. With this configuration, such a situation that the flick operation is erroneously detected can be suppressed even when the finger is unintentionally lifted from the touch panel 1201 due to the large curvature ratio of the convex shape. Meanwhile, the flick threshold value is changed less greatly as the curvature ratio increases toward a concave shape. With this configuration, such a situation that the flick operation is erroneously detected can be suppressed even when the finger fails to be lifted from the touch panel 1201 due to the large curvature ratio of the concave shape. In an area with an originally small curve, that is, near the curvature ratio of 0 within the graph, the threshold values defined in the first embodiment and the second embodiment can be used, and the operability exhibited in the first embodiment and the second embodiment is inhibited from being lowered.

Now, a fourth embodiment of the present invention is disclosed. The first to third embodiments are described on the premise that the curvature ratio of the touch panel never changes after manufacturing time of the product. A fourth embodiment of the present invention is described by taking an example of applying the present invention to such a device, e.g., a paper-like display, as can be curved by the user at runtime. In short, the touch panel is configured to be curved depending on applied pressure. The hardware configuration of the information processing device 300 and the configuration of the functional blocks thereof are the same as those of the first embodiment except for the touch panel. In this embodiment, a pressure sensor is provided to the front surface of the touch panel or a support portion of the touch panel. In the curvature ratio acquisition processing (Step S503) of FIG. 5, the curvature ratio is detected based on a detection value of the pressure sensor or a change in detection values exhibited at a plurality of touch operations, and the detection result is acquired. In short, the curvature ratio of the touch panel at the time of detection of the touch operation is detected, and the detection result is acquired. With this configuration, the present invention can be applied to even the touch panel that inhibits the curvature ratio of the front surface from being acquired in advance.

Now, a fifth embodiment of the present invention is disclosed. The first to fourth embodiments are described by taking the example of determining the flick threshold value based on the continuous function using the curvature ratio as a parameter in the determination processing for determining the flick threshold value (Step S504) of FIG. 5. A fifth embodiment of the present invention is described by taking an example of determining the flick threshold value based on a discontinuous function using the curvature ratio as a parameter. The hardware configuration of the information processing device 300 and the configuration of the functional blocks thereof are the same as those of the first embodiment.

Figure 15A:
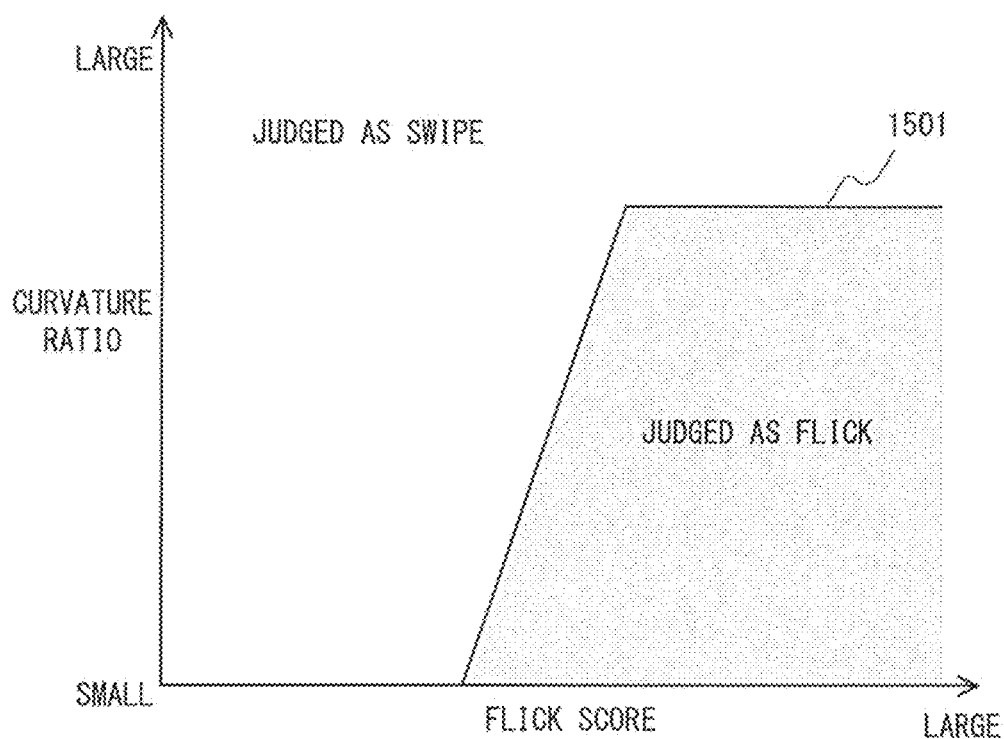
FIG. 15A and FIG. 15B are each a graph for showing a relationship between the curvature ratio and the operation judgment result.

FIG. 15A is a graph for showing the curvature ratio and the judgment result of the swipe or the flick, which are obtained when the flick threshold value is determined based on the following discontinuous function. A constant E is a predetermined value actually measured based on a plurality of cases. Further, the curvature ratio of the touch panel exhibited when the operation of lifting the finger occurs is represented by U.

(When U≤E)

$$\text{(flick threshold value)} = A \times U + B \quad (4)$$

(When U>E)

$$\text{(flick threshold value)} = \infty \quad (5)$$

In this manner, when the curvature ratio is equal to or smaller than the constant E, a continuous function is used as the function for determining the flick threshold value, but when the curvature ratio is larger than the constant E, a discontinuous function is used. Therefore, the flick threshold value is set to be infinite. When it is clear that the curvature ratio is so extremely large as to inhibit a normal flick operation to be performed with a human finger in actuality, the erroneous detection of the flick operation can be effectively inhibited through use of such functions.

Further, the function for determining the flick threshold value may have no curvature ratio as a parameter as follows. (When (Curvature Ratio of the Touch Panel Exhibited when the Operation of Lifting the Finger Occurs)≤E)

$$\text{(flick threshold value)} = B \quad (6)$$

(When (Curvature Ratio of the Touch Panel Exhibited when the Operation of Lifting the Finger Occurs)>E)

$$\text{(flick threshold value)} = \infty \quad (7)$$

Figure 15B:
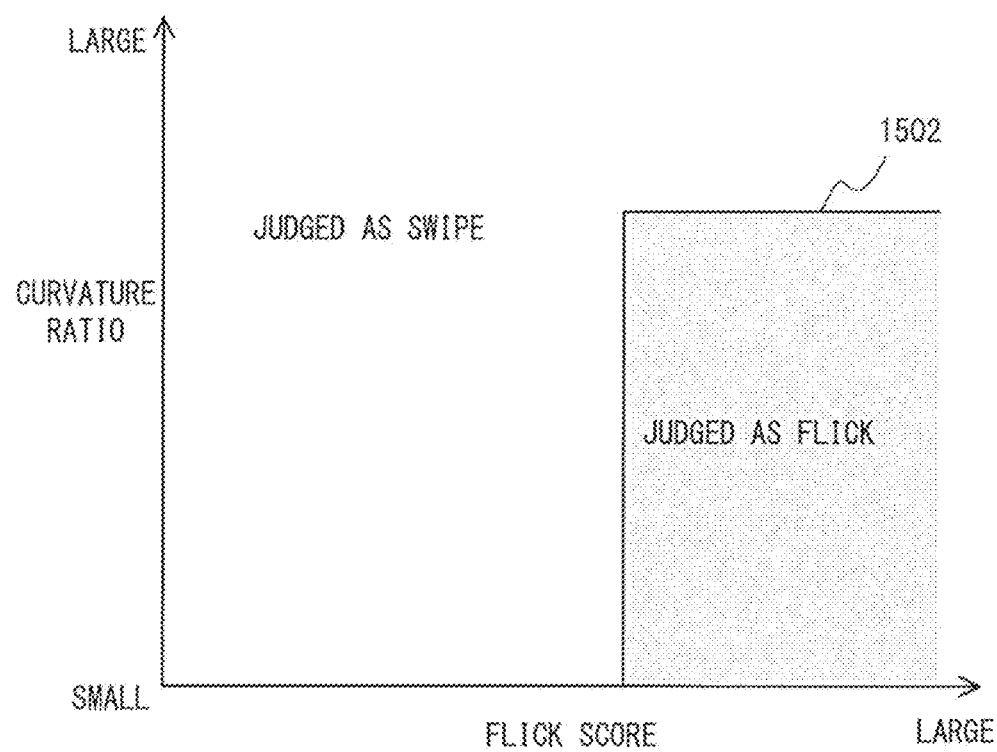

With those functions, as shown in FIG. 15B, when the curvature ratio of the touch panel is equal to or smaller than a predetermined value, the flick threshold value (B) being a fixed value is determined, and when the curvature ratio is larger than the predetermined value, the flick threshold value is set to be infinite so as to inhibit the flick from being judged. This can simplify processing for calculating the flick threshold value.

As described above, according to the present invention, it is judged based on the curvature ratio corresponding to the direction of a given touch operation whether or not the given touch operation is a predetermined operation, and hence the touch operation can be inhibited from being erroneously detected even with the touch panel having a curved front surface.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

More specifically, the respective embodiments are described by taking the example in which the user's finger is used for the touch operation. However, the exemplary embodiments described so far can be applied to even a case where a stylus or another instruction body is used. Further, the object of the present invention is also achieved by causing the information processing device 300 to execute a computer program for implementing the functions of the respective embodiments, which is read from a storage medium having recorded thereon the computer program. In this case, the computer program read from the storage medium implements the functions of the embodiments described above, and the storage medium storing the computer program is involved in the present invention. Further, in addition to the computer program itself, the present invention also involves a case where an OS and the like operating on a computer conducts a part or an entirety of actual processing based on an instruction issued when the computer program is executed and the functions of the respective embodiments described above are implemented by the processing.

The present invention can also be applied to even a case where the computer program read from the storage medium is written to a memory provided to a function expansion board or a unit that is inserted into the information processing device 300. That is, the present invention also involves a case where a CPU or the like provided to the function expansion board or the unit conducts a part or an entirety of the processing based on the instruction of the computer program written to the memory and the functions of the respective embodiments are implemented by the processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-213186, filed Oct. 29, 2015 which is hereby incorporated by reference herein in its entirety.

What is claimed is:

1. An information processing device comprising:
one or more processors configured to function as:
a specification unit configured to specify operation information including a movement direction and a speed of an input object inputting a touch operation input to a touch panel having a curved front surface;
an acquisition unit configured to acquire a curvature of the touch panel along the movement direction of the input object;
a determination unit configured to determine a threshold, for judging a kind of the touch operation, relating to the speed at a position of the input object when the input object is lifted from the curved front surface during the touch operation, such that the larger the curvature, the more difficult it is to determine that the input object is lifted from the curved front surface; and
a judgment unit configured to judge that the touch operation is a first touch operation, which is an operation for lifting the input object, with the input object sliding, for flipping the curved front surface with the input object in a case where the speed exceeds the threshold determined by the determination unit, and to judge that the touch operation is a second touch operation, which is an operation for continuing the sliding of the input object without the first touch operation in a case where the speed does not exceed the threshold.

2. The information processing device according to claim 1, wherein the specification unit is configured to:
specify a lift of the input object based on information notified of by a sensor provided to the touch panel; and
identify a movement direction and a speed of the input object during a predetermined period before the lift is detected.

3. The information processing device according to claim 2, wherein:
the determination unit is configured to determine a threshold value relating to the speed of the input object, which is used to distinguish between the first touch operation and the second touch operation; and
the one or more processors further function as a recognition unit configured to recognize that the touch operation is the first touch operation in a case where a score based on the speed of the input object identified by the specification unit exceeds the threshold value relating to the speed determined by the determination unit.

4. The information processing device according to claim 3, wherein the determination unit is configured to:
change the threshold value more greatly as the degree of the curve increases toward a convex shape; and
change the threshold value less greatly as the degree of the curve increases toward a concave shape.

5. The information processing device according to claim 2, wherein the specification unit is configured to:
store information relating to a series of touch positions, which is detected during a predetermined period immediately before the lift, in a predetermined memory; and
identify the movement direction and the speed based on the stored information.

6. The information processing device according to claim 1, wherein the determination unit is configured to determine the threshold relating to the speed based on a continuous function using the acquired curvature as a parameter.

7. The information processing device according to claim 1, wherein the determination unit is configured to determine the threshold relating to the speed based on a discontinuous function using the acquired curvature as a parameter.

8. The information processing device according to claim 1, wherein the determination unit is further configured to dynamically change the threshold relating to the speed depending on a magnitude of the curvature.

9. The information processing device according to claim 1, further comprising a memory configured to hold a table for defining a correspondence relationship between a position on the touch panel and the degree of the curve,
wherein the acquisition unit is configured to acquire the degree of the curve with reference to the table.

10. The information processing device according to claim 1, wherein the acquisition unit is configured to:
dynamically calculate the degree of the curve; and
acquire a result of the calculation.

11. The information processing device according to claim 1, wherein:
the touch panel comprises a pressure sensor provided to one of a front surface of the touch panel and a support portion of the touch panel; and
the acquisition unit is configured to:
detect the degree of the curve based on one of a detection value of the pressure sensor and a change in detection values exhibited at a plurality of touch operations; and
acquire a result of the detection.

12. The information processing device according to claim 1, wherein:

the touch panel is configured to be curved depending on applied pressure; and the acquisition unit is configured to:
  detect the degree of the curve of the touch panel exhibited when the touch operation is detected; and
  acquire a result of the detection.

13. The information processing device according to claim 1, further comprising a memory configured to hold a table for defining a correspondence relationship between the curvature and the threshold relating to the speed of the input object,
wherein the determination unit is configured to acquire the threshold relating to the speed corresponding to the acquired curvature with reference to the table.

14. The information processing device according to claim 1, wherein the acquisition unit is configured to acquire a numerical value representing the curvature.

15. An information processing device comprising:
a detection unit configured to detect operation information including a direction and a speed of a touch operation input to a touch panel having a curved front surface;
an acquisition unit configured to acquire a degree of a curve of the touch panel along the detected direction;
a determination unit configured to determine a condition relating to the speed of the touch operation, which differs depending on the acquired degree of the curve; and
a judgment unit configured to judge that the touch operation is a flick operation based on a fact that the detected speed satisfies the condition relating to the speed of the touch operation determined by the determination unit
wherein:
the degree of the curve comprises a curvature of the touch panel; and
the determination unit is configured to:
  determine the condition relating to the speed based on a continuous function using the curvature as a parameter in a case where the acquired curvature is equal to or smaller than a predetermined value; and
  determine the condition relating to the speed based on a discontinuous function using the curvature as a parameter in a case where the acquired curvature is larger than the predetermined value.

16. An information processing device, comprising:
a detection unit configured to detect operation information including a direction and a speed of a touch operation input to a touch panel having a curved front surface;
an acquisition unit configured to acquire a degree of a curve of the touch panel along the detected direction;
a determination unit configured to determine a condition relating to the speed of the touch operation, which differs depending on the acquired degree of the curve, wherein the condition is a threshold value which is used to distinguish between a flick operation and another operation; and
a recognition unit configured to recognize that the touch operation is the flick operation based on a fact that a score based on the speed of the touch operation identified by the detection unit exceeds the threshold value relating to the speed determined by the determination unit,
wherein the determination unit is configured to:
  determine a threshold value being a fixed value in a case where the acquired degree of the curve falls within a fixed range; and
  set the threshold value to be infinite in a case where the degree of the curve falls out of the fixed range.

17. A method to be executed by an information processing device, comprising:
specifying operation information including a movement direction and a speed of an input object inputting a touch operation input to a touch panel having a curved front surface;
acquiring a curvature of the touch panel along the movement direction of the input object;
determining a threshold, for judging a kind of the touch operation, relating to the speed at a position of the input object when the input object is lifted from the curved front surface during the touch operation, such that the larger the curvature, the more difficult it is to determine that the input object is lifted from the curved front surface; and
judging that the touch operation is a first touch operation, which is an operation for lifting the input object, with the input object sliding, for flipping the curved front surface with the input object in a case where the speed exceeds the determined threshold and to judge that the touch operation is a second touch operation, which is an operation for continuing the sliding of the input object without the first touch operation in a case where the speed does not exceed the determined threshold.

18. An information processing device comprising:
one or more processors configured to function as:
  a specification unit configured to specify a touch position of a touch performed by an input object on an operation surface having a curved front surface;
  a determination unit configured to determine a threshold, for judging a kind of a touch operation, which has been inputted by the input object to the information processing device, and a final position on the operation surface on which the touch position is finally detected along a movement direction of the input object identified by a shift in the touch position before the final position is detected during the touch operation, such that the larger a curvature, the more difficult it is to determine that the input object is lifted from the operation surface; and
  a recognition unit configured to recognize that a first touch operation, which is an operation for lifting the input object, with the input object sliding, for flipping the curved front surface with the input object has been inputted to the information processing device in a case where a change in the touch position during a predetermined period before the final position is detected exceeds the determined threshold and to recognize that a second touch, which is an operation for continuing the sliding of the input object without the first touch operation has been inputted to the information processing device in a case where the change in the touch position during the predetermined period before the final position is detected does not exceed the determined threshold.

19. The information processing device according to claim 18, wherein:
the determination unit is configured to determine, as the threshold, a threshold value of a movement speed of the input object identified based on the touch position during the predetermined period before the final position is detected; and
the recognition unit is configured to recognize that the first touch operation has been input to the information processing device in a case where the movement speed of the input object during the predetermined period before the final position is detected exceeds the threshold value of the movement speed determined as the threshold.

20. The information processing device according to claim 18, wherein the determination unit is configured to:
   acquire a curvature along the movement direction of the input object; and
   select the threshold corresponding to the curvature.

21. The information processing device according to claim 18, wherein:
   the specification unit is configured to specify the touch position on the operation surface having the curved front surface with a predetermined cycle, to thereby allow the touch position identified as the same touch position to be tracked; and
   the recognition unit is configured to judge whether or not the first touch operation has been inputted by the input object based on a series of touch positions, which are tracked after a given touch position is first detected by the specification unit, based on the threshold with a trigger that the inputting of the series of touch positions is finished by a lift.

* * * * *